UNITED STATES PATENT OFFICE.

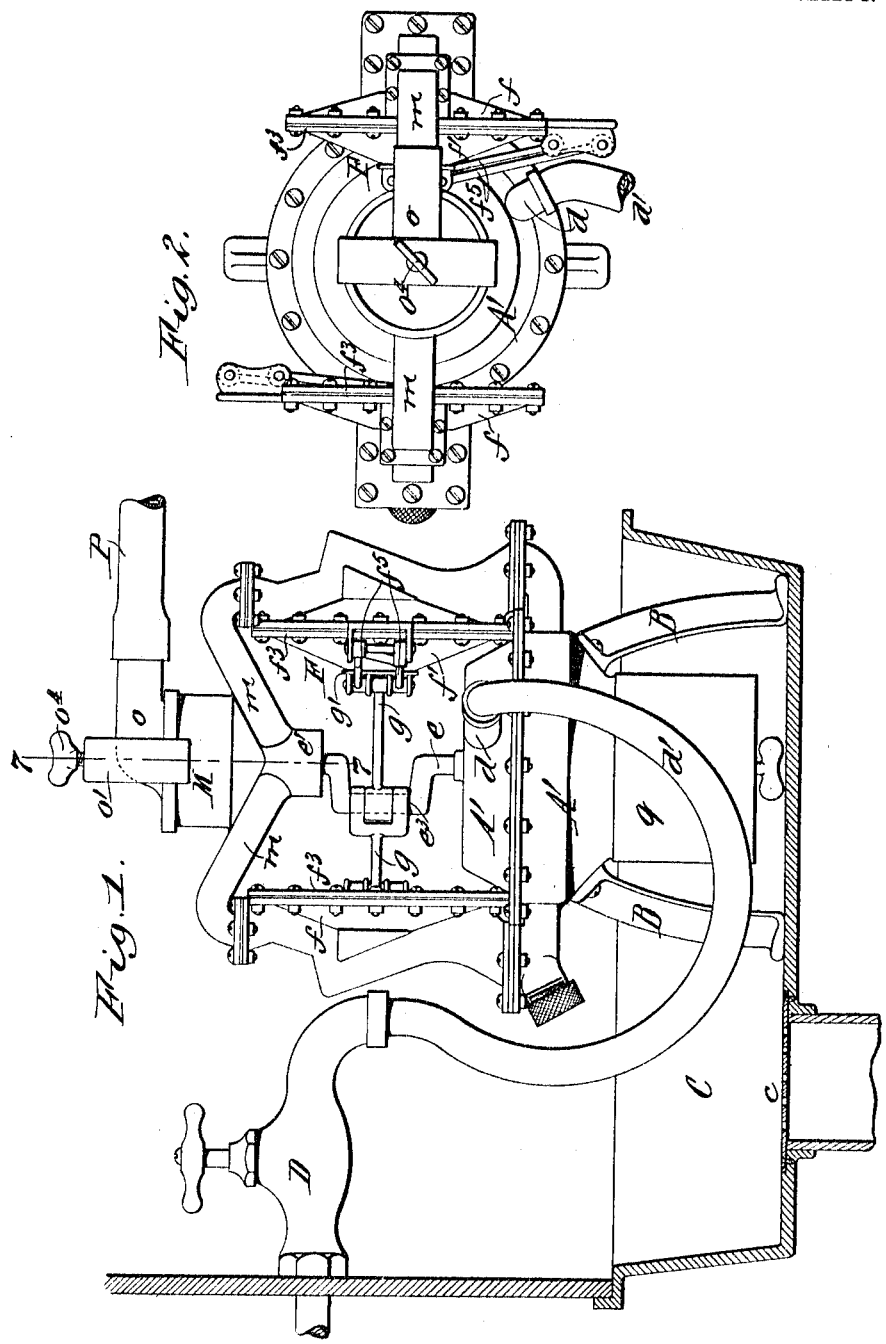
A. F. KRAUSE.
AIR PUMP.
APPLICATION FILED APR. 16, 1910.
1,119,834.
Patented Dec. 8, 1914
5 SHEETS—SHEET 1.
Witnesses:
Richard Sommer
Alfred Borkenhagen
Inventor
Albert F. Krause,
by Geyer & Popp
Attorneys

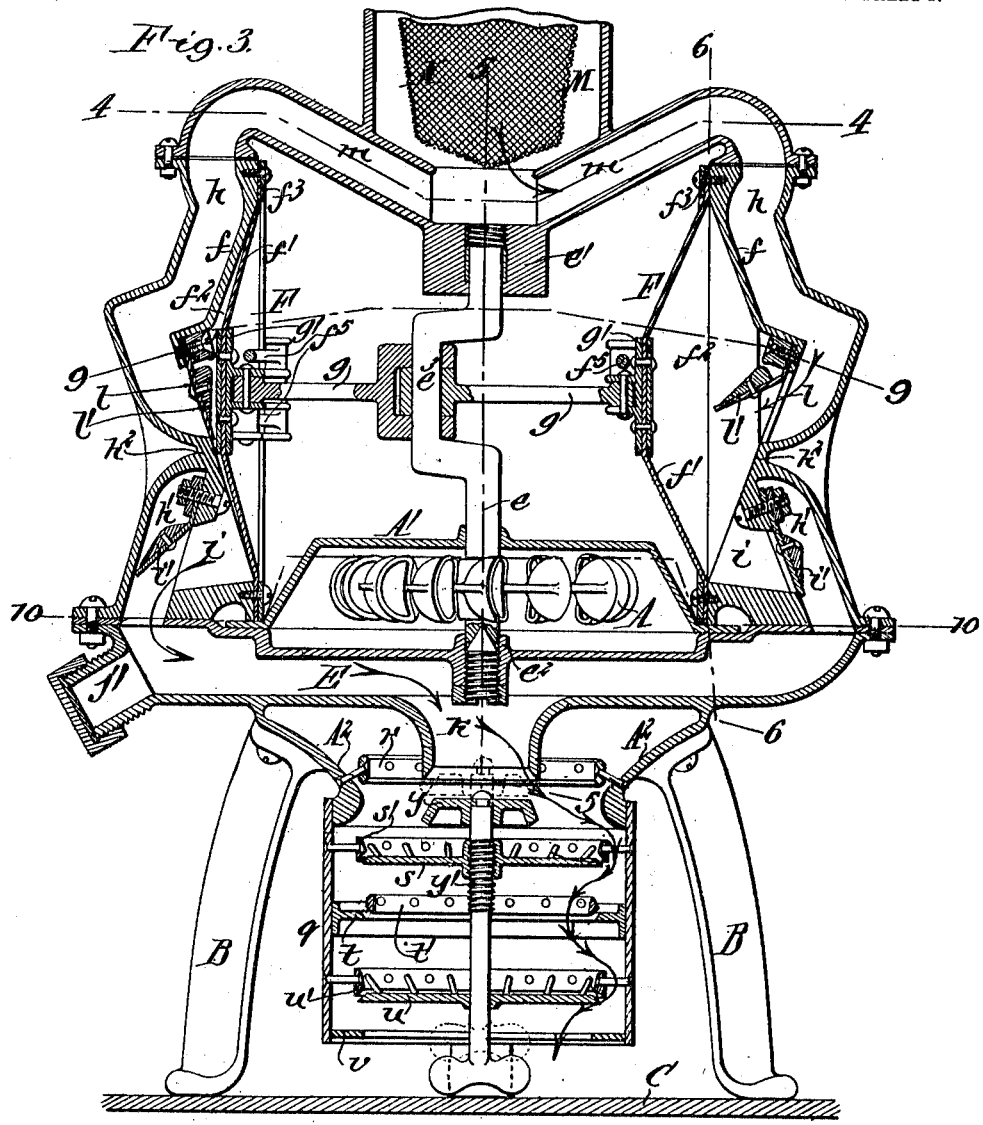
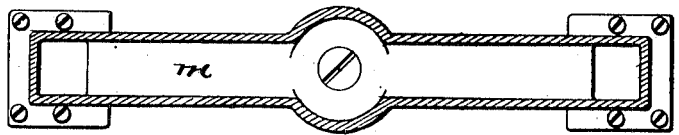

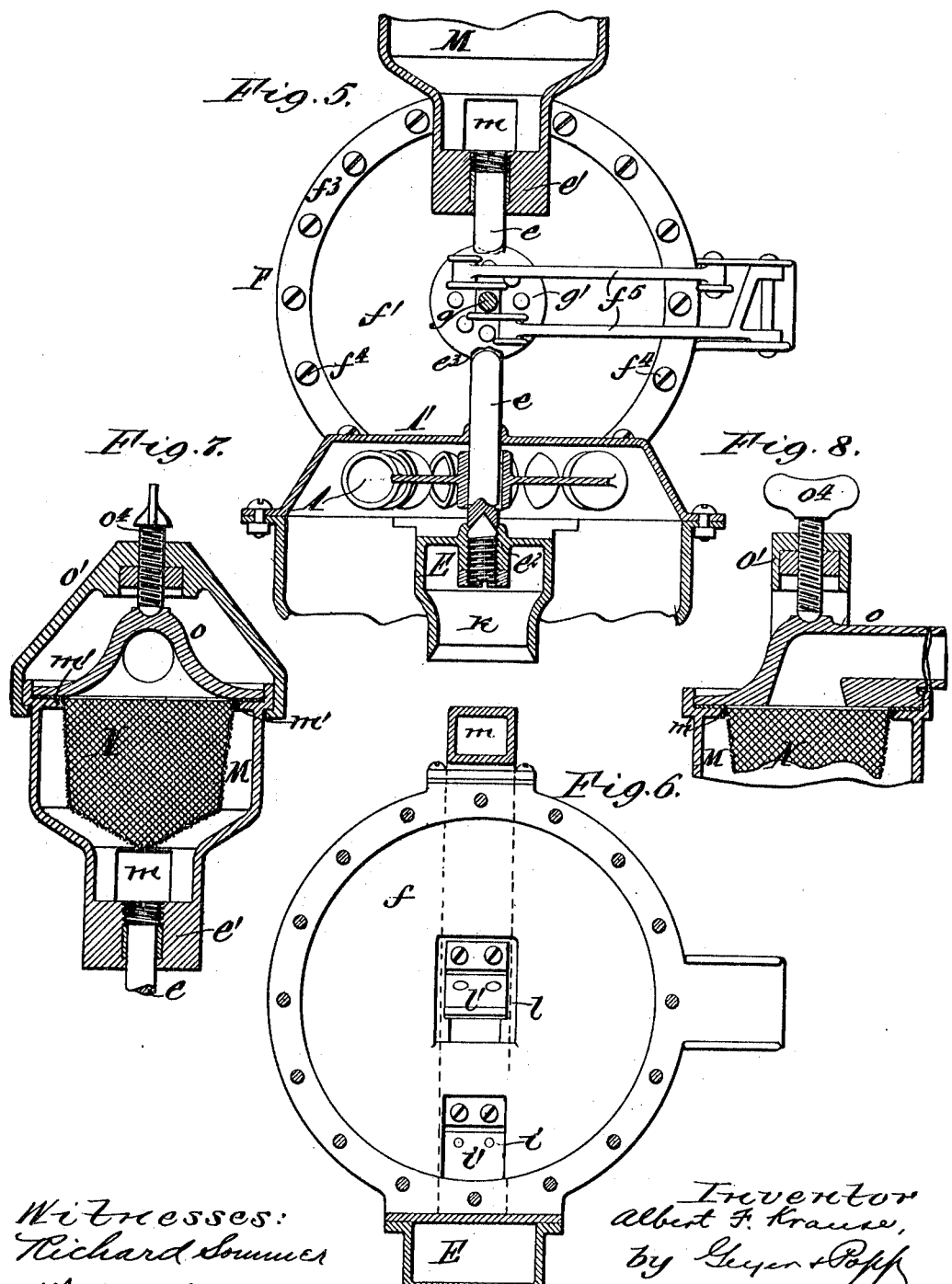

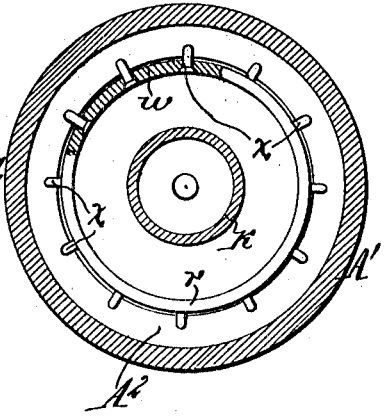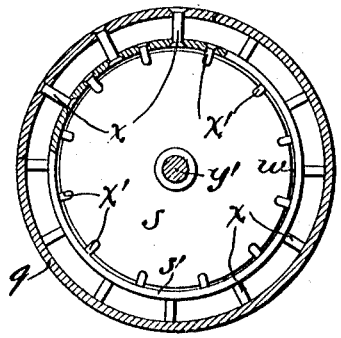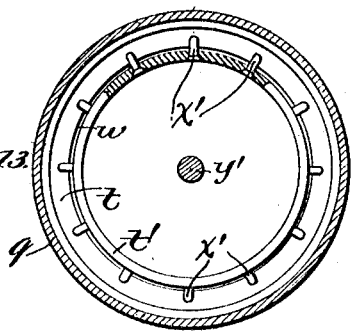

ALBERT F. KRAUSE, OF BUFFALO, NEW YORK, ASSIGNOR OF ONE-HALF TO CHARLES C. LADD, OF BUFFALO, NEW YORK.

AIR-PUMP.

1,119,834.  Specification of Letters Patent.  Patented Dec. 8, 1914.

Application filed April 16, 1910. Serial No. 555,961.

*To all whom it may concern:*

Be it known that I, ALBERT F. KRAUSE, a citizen of the United States, residing at Buffalo, in the county of Erie and State of New York, have invented a new and useful Improvement in Air-Pumps, of which the following is a specification.

This invention relates to an air pump designed more particularly for use in connection with a vacuum cleaner. Its object is the provision of a simple, compact and inexpensive apparatus of this kind.

Figure 9:
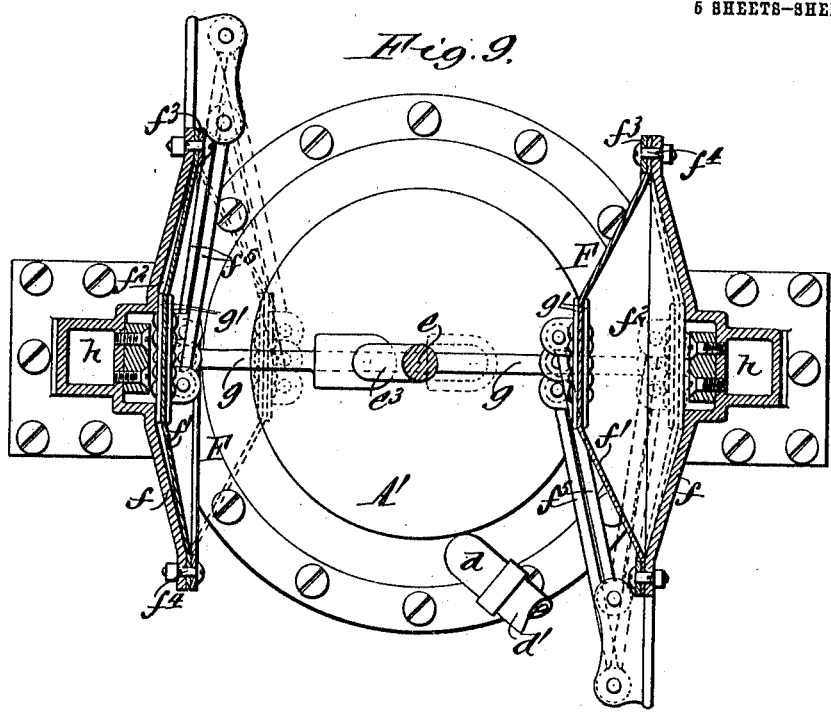
Figure 10:
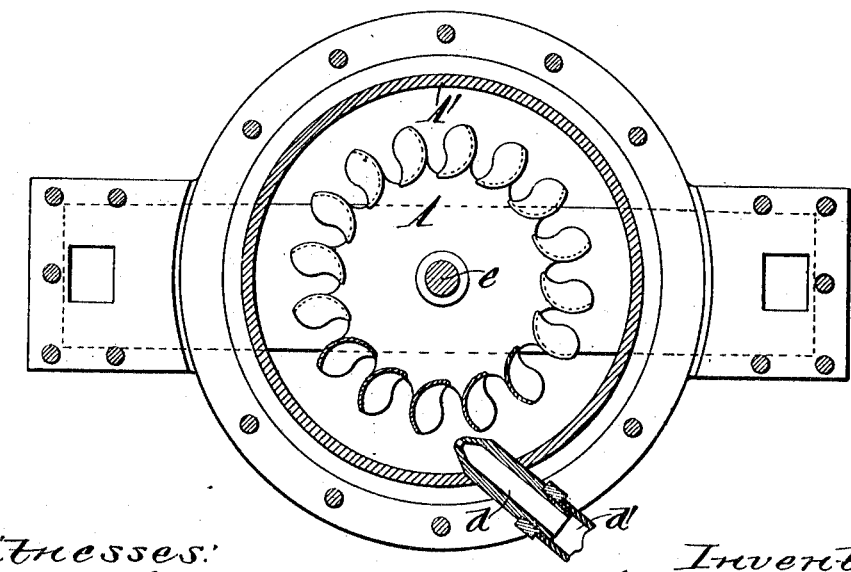

In the accompanying drawings: Figure 1 is a side elevation of the pump placed in a sink and connected with an ordinary faucet. Fig. 2 is a top plan view thereof. Fig. 3 is a sectional elevation of the device, on an enlarged scale. Fig. 4 is a horizontal section on line 4—4, Fig. 3. Figs. 5 and 6 are vertical sections on the correspondingly numbered lines in Fig. 3. Fig. 7 is a vertical section of the strainer and adjacent parts on line 7—7, Fig. 1, on an enlarged scale. Fig. 8 is a vertical section at right angles to Fig. 7. Figs. 9 and 10 are horizontal sections on the correspondingly-numbered lines in Fig. 3.

Similar letters of reference indicate corresponding parts throughout the several views.

A indicates a water-motor or wheel of any suitable construction, that shown in the drawings being a turbine of the well known bucket-type and arranged horizontally in an inclosing case $A^1$. The latter has legs B by which the apparatus is supported in a sink C or other suitable receptacle connected with a drain or sewer.

$d$ is the tangential nozzle passing through the side of the motor-case for directing a jet of water against the buckets of the wheel, and $d^1$ is a hose or other suitable conduit for connecting said nozzle with a faucet D or other source of water under pressure. The shaft $e$ of the water wheel extends upwardly through the wheel case and is journaled at its upper end in a suitable bearing $e^1$ while its lower end is supported in a step bearing $e^2$ carried by a horizontal air discharge conduit E extending centrally through the motor-case.

F, F indicate a pair of exhaust devices or suction pumps arranged on opposite sides of the shaft $e$ and driven by the same. These pumps may be of any suitable construction but are preferably of the diaphragm type shown in the drawings, each consisting of an upright dished head or plate $f$ and a diaphragm $f^1$ of leather or other suitable flexible material covering the inner side of the plate and forming therewith an intermediate pump chamber $f^2$. The edge of this diaphragm is clamped to the inner face of the plate $f$ by a ring $f^3$ and screws $f^4$, or other suitable fastening. The diaphragms of the pumps are actuated by rods $g$ pivoted at their outer ends to reinforcing plates $g^1$ secured to the central portions of the diaphragms, and at their inner ends to a crank $e^3$ of the motor-shaft $e$, by which construction a duplex or double-acting pump is obtained. As shown, the pumps are supported upon and secured to the projecting end portions of the air discharge conduit E.

In order to relieve the diaphragms $f^1$ from the weight of the connecting rods $g$ and attaching plates $g^1$ and avoid uneven stretching or distortion thereof, the outer ends of said rods and the central portions of the diaphragms are preferably carried by horizontally-swinging supporting arms $f^5$ pivoted at their inner ends to the diaphragms and at their outer ends to lugs or brackets of the plates $f$.

On the outer side of each plate $f$ are located an upper inlet conduit $h$ and a lower exhaust conduit $h^1$, which conduits are separated by a partition $h^2$, as shown in Fig. 3. Each exhaust conduit $h^1$ is connected with the adjacent pump-chamber by a port $i$ controlled by an outwardly-opening valve $i^1$, while the lower end of said conduit is connected with the air discharge tube E. The latter is provided centrally with a depending delivery neck $k$.

The lower portion of each inlet conduit $h$ connects with the corresponding pump chamber by a port $l$ controlled by an inwardly-opening valve $l^1$, while the upper end of said conduit is connected by a tube or passage $m$ with the bottom of a screen-chamber M surmounting the tubes $m$. This chamber is tightly closed on all sides and contains a comparatively coarse screen N adapted to intercept lint, hair, small pieces of paper and similar cleanings which if allowed to pass through the cleaner into the sink might clog its usual strainer $c$. In its preferred form, shown in the drawings, the screen N is cup-shaped and removably suspended from an inwardly-extending flange or shoulder $m^1$ of the chamber M against which the wired or flanged upper edge of the screen is clamped by a suction-connection or elbow $o$, as shown in Figs. 1, 7 and 8. Attached to this connection is the usual hose or flexible conduit P, the free end of which carries the customary nozzle, not shown, which is adapted to be passed over the carpet or other article to be cleaned.

The connection $o$ may be removably secured to the top of the screen chamber by any suitable means, those shown in the drawings consisting of a yoke $o^1$ which engages under the shouldered upper end of the screen chamber, and a clamping or thumb-screw $o^4$ which bears upon the connection $o$, thus firmly clamping it down upon the screen chamber and securing the screen in place. Upon loosening this yoke, the connection $o$ and the screen N can be removed from the chamber for discharging accumulations from the screen from time to time.

In the drawings, the air pumps are shown as having hinged or flap valves, but spherical or other suitable valves may obviously be substituted for the same, if desired.

As shown, the upper bearing $e^1$ of the motor shaft is carried by the inner ends of the tubes $m$ which latter are preferably depressed or inclined toward the bearing, in order to lower the screen chamber M and render the apparatus more compact.

$q$ indicates a dust and air mixing tube or chamber arranged to receive the spent water from the motor-wheel and the dust-laden air from the discharge conduit E of the suction pumps, the neck $k$ delivering the dust-laden air centrally into the top of the mixing chamber, so as to commingle the dust with the water and discharge it into the sink or other receptacle and thence into the sewer. In the construction shown in the drawings, the motor-case is provided with a funnel-shaped downward extension $A^2$ which carries the mixing chamber $q$, of which latter it practically forms a continuation. The mixing chamber is open at its lower end, as seen in Fig. 3.

In order to more effectually mix the dust with the water and prevent any of it from reëntering the apartment, the mixing chamber $q$ is provided with suitable means for retarding the escape of the dust-laden air and distributing and discharging the spent water through the mixing chamber in an annular or practically continuous sheet through which the stream of dust-laden air is compelled to pass one or more times, thus thoroughly wetting all of the dust and washing it into the sewer. The preferred devices shown in the drawings for this purpose are constructed as follows: $r$ indicates a wall or dam surrounding the discharge-neck $k$ and arranged in close proximity to the funnel-shaped bottom $A^2$ of the motor-case, to form an overflow pan which receives from the motor the spent water which latter overflows said dam, producing an annular sheet or water-curtain through which the incoming dust-laden air passes outwardly. Below the dam $r$ may be arranged additional overflow pans. In the construction shown, the second pan comprises a bottom-plate $s$ and a dam $s^1$; the third consists of a bottom plate $t$ extending inwardly from the wall of the mixing chamber and having a central opening, adjacent to the edge of which is a dam $t^1$; while the last pan comprises a bottom plate $u$ and a dam $u^1$. Below the fourth pan is preferably a baffle-ring $v$.

In the use of the apparatus, upon admitting the motive liquid to the motor-case A, the motor-wheel is rapidly rotated, operating the air pumps and creating a suction current through the hose or conduit P and the usual cleaning nozzle carried by the same. The dust removed from the carpet or other article is drawn through the screen N which latter intercepts any large particles liable to clog the sink-strain, as heretofore described, while the dust-laden air is drawn through the inlet conduits $m$ and $h$, and the pump chambers and discharged through the tube E and neck $k$ into the mixing chamber $q$ where it repeatedly traverses the sheet of water descending through the latter, thoroughly commingling the dust with the water and finally draining it as already described.

In order to permit the use of the apparatus as an air forcing pump or blower, if desired, the discharge conduit E is provided with a supplemental outlet, preferably in the form of a capped screw nipple $j^1$ to which a compressed air discharge hose or conduit may be attached after removing the cap, and a valve $y$ is provided for closing the lower end of the neck $k$, as shown by dotted lines in Fig. 3, to cut off the discharge of the air at that point and compel it to escape solely through the nipple $j^1$. In the construction shown in the drawings, the valve is carried by a screw threaded stem $y^1$ engaging a threaded opening in one of the overflow pans, the valve-stem passing through the bottom of the lowermost pan and terminating in a suitable handle convenient of access from the outside of the dust and air mixing chamber.

While I have herein shown a double acting suction pump, a single acting-pump may be used if desired.

This improved cleaner, while effectually disposing of the dust without the necessity of handling the same, also has the advantages of compactness and portability, permitting its storage in a small space and rendering it especially desirable for household use where water-power is generally available. Its simple construction more-over, enables it to be put in service and used by persons unskilled in the use of machines, while its moderate cost of manufacture brings it within the reach of ordinary households.

I claim as my invention:

1. In a vacuum cleaner, the combination of a water-motor having a crank shaft, suction pumps arranged on opposite sides of said shaft and operatively connected therewith, an air discharge conduit connected with the pumps, and a transverse suction conduit connected with the inlets of said pumps and carrying the upper bearing of the motor-shaft.

2. In a vacuum cleaner, the combination of a water-motor having a crank shaft, suction pumps arranged on opposite sides of said shaft and operatively connected therewith, an air discharge conduit arranged transversely below the motor and carrying the lower bearing of its shaft, and a transverse suction conduit connected with the upper ends of the pumps and carrying the upper bearing of said shaft.

3. In a vacuum cleaner, the combination of a water-motor, an exhaust device operated by the motor and having inlet and discharge conduits, said discharge conduit having a main outlet and a supplemental outlet, and means for closing one or the other of said outlets.

4. In a vacuum cleaner, the combination of a water-motor, an exhaust device operated by the motor and having inlet and discharge conduits, said discharge conduit having a main outlet and a supplemental outlet, a cap for closing said supplemental outlet, and a valve for closing said main outlet.

Witness my hand this 15th day of April, 1910.

ALBERT F. KRAUSE.

Witnesses:
C. F. GEYER,
E. M. GRAHAM.

Copies of this patent may be obtained for five cents each, by addressing the "Commissioner of Patents, Washington, D. C."